United States Patent
Kawasaki et al.

(10) Patent No.: US 11,054,308 B2
(45) Date of Patent: Jul. 6, 2021

(54) SPECTROPHOTOMETER

(71) Applicant: Konica Minolta, Inc., Chiyoda-ku (JP)

(72) Inventors: Takashi Kawasaki, Sakai (JP);
Hidehiko Fujii, Kawachinagano (JP);
Katsutoshi Tsurutani, Osaka (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/616,151

(22) PCT Filed: Apr. 24, 2018

(86) PCT No.: PCT/JP2018/016602
§ 371 (c)(1),
(2) Date: Nov. 22, 2019

(87) PCT Pub. No.: WO2018/221082
PCT Pub. Date: Dec. 6, 2018

(65) Prior Publication Data
US 2020/0182693 A1 Jun. 11, 2020

(30) Foreign Application Priority Data
Jun. 1, 2017 (JP) .............................. JP2017-109177

(51) Int. Cl.
*G01J 3/10* (2006.01)
*G01J 3/18* (2006.01)

(52) U.S. Cl.
CPC .. *G01J 3/10* (2013.01); *G01J 3/18* (2013.01)

(58) Field of Classification Search
CPC .... G01J 3/10; G01J 3/00; G01J 3/0254; G01J 3/0256; G01J 1/00; G01N 2201/065
See application file for complete search history.

(56) References Cited

U.S. PATENT DOCUMENTS 4,917,495 A * 4/1990 Steenhoek ............ G01J 3/0251
356/328
10,321,826 B2 * 6/2019 Won ....................... H04N 5/232
(Continued)

FOREIGN PATENT DOCUMENTS

| CN | 101109659 | 1/2008 |
| CN | 103261857 | 8/2013 |

(Continued)

OTHER PUBLICATIONS

Office Action dated Mar. 17, 2021 issued in Chinese Patent Application No. 201880035080.0.

*Primary Examiner* — Maurice C Smith
(74) *Attorney, Agent, or Firm* — Cozen O'Connor

(57) ABSTRACT

Observation light can be applied to a position for measurement without providing large space in a spectrophotometer, and the position for measurement can be easily known. A slit is disposed at a position optically conjugate with the position for measurement in the spectrophotometer. Light from an object to be measured passes through the slit, travels along a measurement optical path, and is subject to wavelength dispersion by a wavelength dispersing element. An observation light source is retracted outside the measurement optical path at the time of measuring a spectral spectrum. At the time of observing the position for measurement, the observation light source is inserted into the measurement optical path, and emits observation light toward the slit. Alternatively, light from an object to be measured passes through the slit, and is diffracted by a grating. The observation light source is disposed on an optical path of zeroth light. The observation light source emits observation light toward the grating at the time of observing the position for measurement.

7 Claims, 6 Drawing Sheets

(56) References Cited

U.S. PATENT DOCUMENTS

| | | | |
|---|---|---|---|
| 2003/0011767 A1* | 1/2003 | Imura | G01J 3/10 |
| | | | 356/326 |
| 2018/0067053 A1* | 3/2018 | Aizawa | G01J 3/0208 |
| 2018/0164268 A1* | 6/2018 | Ben-Adert | G01N 21/1717 |
| 2018/0202633 A1* | 7/2018 | Yagi | G01N 21/474 |

FOREIGN PATENT DOCUMENTS

| | | |
|---|---|---|
| JP | 02-147045 | 6/1990 |
| JP | 095934/1991 | 9/1991 |
| JP | 09-166520 | 6/1997 |
| JP | 2009-288150 | 12/2009 |

* cited by examiner

SPECTROPHOTOMETER

RELATED APPLICATIONS

This is a U.S. National Phase Application under 35 USC 371 of International Application PCT/JP2018/016602 filed on Apr. 24, 2018.

This application claims the priority of Japanese application no. 2017-109177 filed Jun. 1, 2017, the entire content of which is hereby incorporated by reference.

TECHNICAL FIELD

The present invention relates to a spectrophotometer.

BACKGROUND ART

In a case where a spectrophotometer for measuring a spectral spectrum has a minute range for measurement, a spectral spectrum to be measured may greatly change from a spectral spectrum of light at an intended position even when a position for measurement is only slightly deviated from the intended position. For this reason, in the case where a spectrophotometer has a minute range for measurement, it is desired that the position for measurement can be observed before measurement and the position for measurement can be moved to the intended position before the measurement. Patent Literature 1 discloses an example of a technique that enables such a thing in a spectroscope.

In the technique disclosed in Patent Literature 1, a shutter is closed when observation light is injected. An LED applies observation light toward the shutter. The shutter reflects the applied observation light toward an objective lens. The objective lens images the reflected light on the surface of an object to be measured. A measurement site is identified from the position of the light imaged on the surface of the object to be measured. When measurement is performed, the shutter is opened, and light that has passed through a slit mirror is guided to a light receiving unit (paragraphs 0027 to 0031).

CITATION LIST

Patent Literature

Patent Literature 1: JP 2009-288150 A

SUMMARY OF INVENTION

Technical Problem

In traditional techniques represented by the technique disclosed in Patent Literature 1, large space needs to be provided in a spectrophotometer for accommodating a mechanism for applying observation light at a measurement position in the spectrophotometer. For example, in the technique disclosed in Patent Literature 1, large space needs to be provided in a spectroscope for accommodating, for example, a slit mirror in the spectroscope.

The invention described below aims to solve the problem. A problem to be solved by the invention described below is to enable application of observation light to a position for measurement without providing large space in a spectrophotometer, and to enable the position for measurement to be easily known.

Solution to Problem

The invention described below relates to a spectrophotometer.

(1) In the first invention described below, light to be measured from a position for measurement is imaged by a light-receiving optical system. This generates imaged light to be measured.

The imaged light to be measured passes through a slit disposed at a position conjugate with the position for measurement. This generates light to be measured, which travels along a measurement optical path.

The light to be measured, which travels along a measurement optical path, is subject to wavelength dispersion by a wavelength dispersing element. This generates light that has been subject to wavelength dispersion.

A sensor receives the light that has been subject to wavelength dispersion, and outputs a signal representing a spectral spectrum.

An insertion/extraction mechanism inserts an observation light source into a measurement optical path at the time of observing a position for measurement, and retracts the observation light source outside the measurement optical path at the time of measuring the spectral spectrum.

The observation light source emits observation light toward the slit at the time of observing the position for measurement.

(2) In the second invention described below, light to be measured from a position for measurement is imaged by a light-receiving optical system. This generates imaged light to be measured.

The imaged light to be measured passes through a slit. This generates light to be measured, which travels along a measurement optical path.

The light to be measured, which travels along the measurement optical path, is diffracted by a grating. This generates diffracted light. The light to be measured, which travels along the measurement optical path, is reflected by the grating. This generates zeroth light.

A sensor receives the diffracted light, and outputs a signal representing a spectral spectrum.

An observation light source is disposed on an optical path of the zeroth light, and emits observation light toward the grating at the time of observing the position for measurement.

Advantageous Effects of Invention

According to the invention described below, observation light can be applied to a position for measurement without providing large space in a spectrophotometer, and the position for measurement can be easily known.

The following detailed description and accompanying drawings will make the object, feature, aspect, and advantage of the invention clearer.

DESCRIPTION OF EMBODIMENTS

1. First Embodiment 1.1 Spectrophotometer

Figure 1:
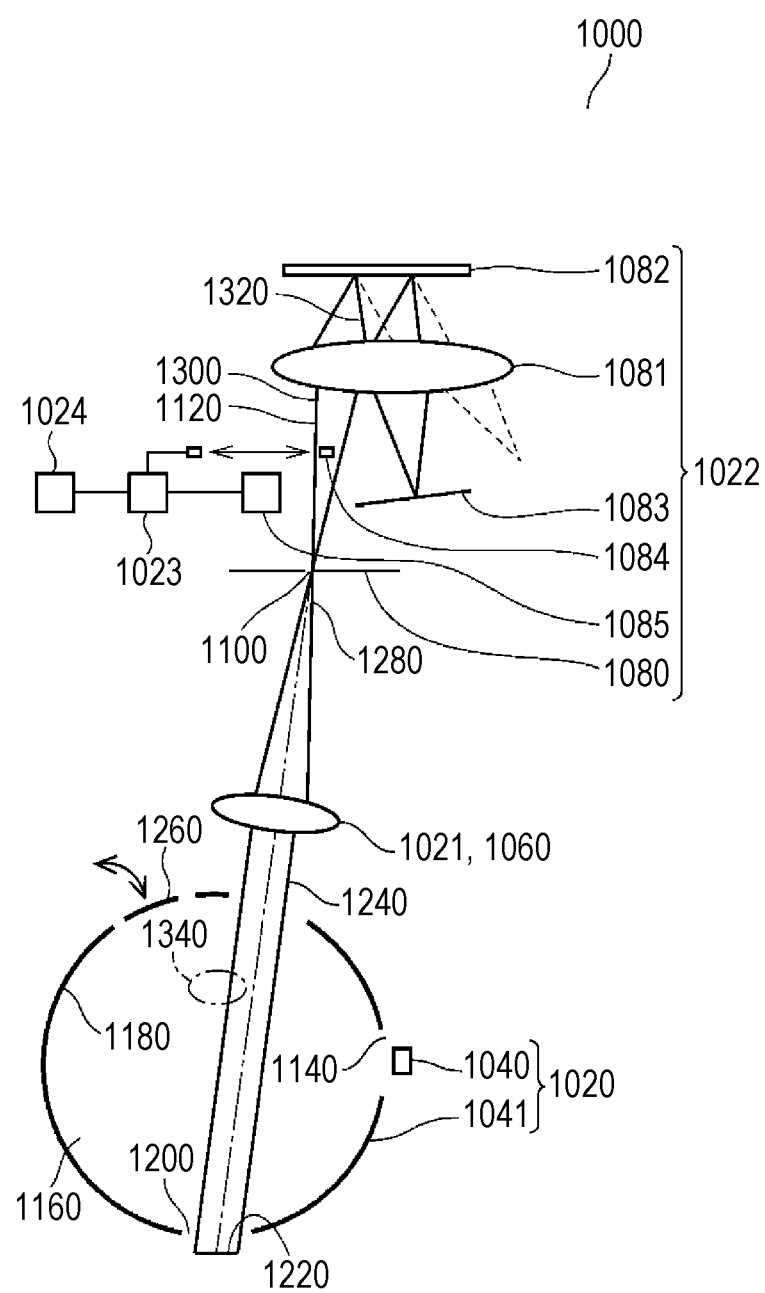
FIG. 1 is a schematic diagram illustrating a spectrophotometer of a first embodiment.
Figure 2:
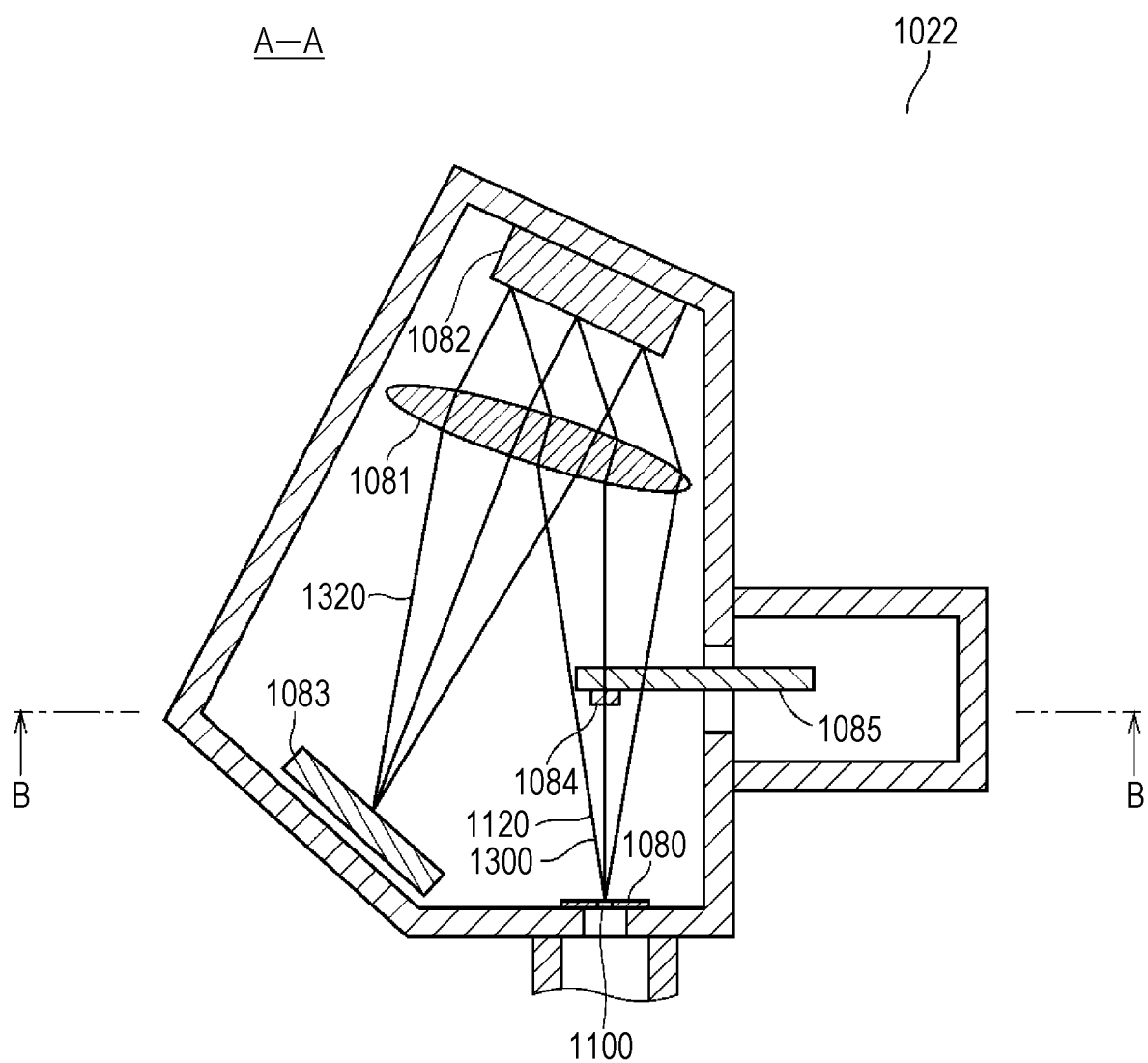
FIG. 2 is a schematic diagram illustrating a cross section of a spectroscope provided in the spectrophotometer of the first embodiment.
Figure 3:
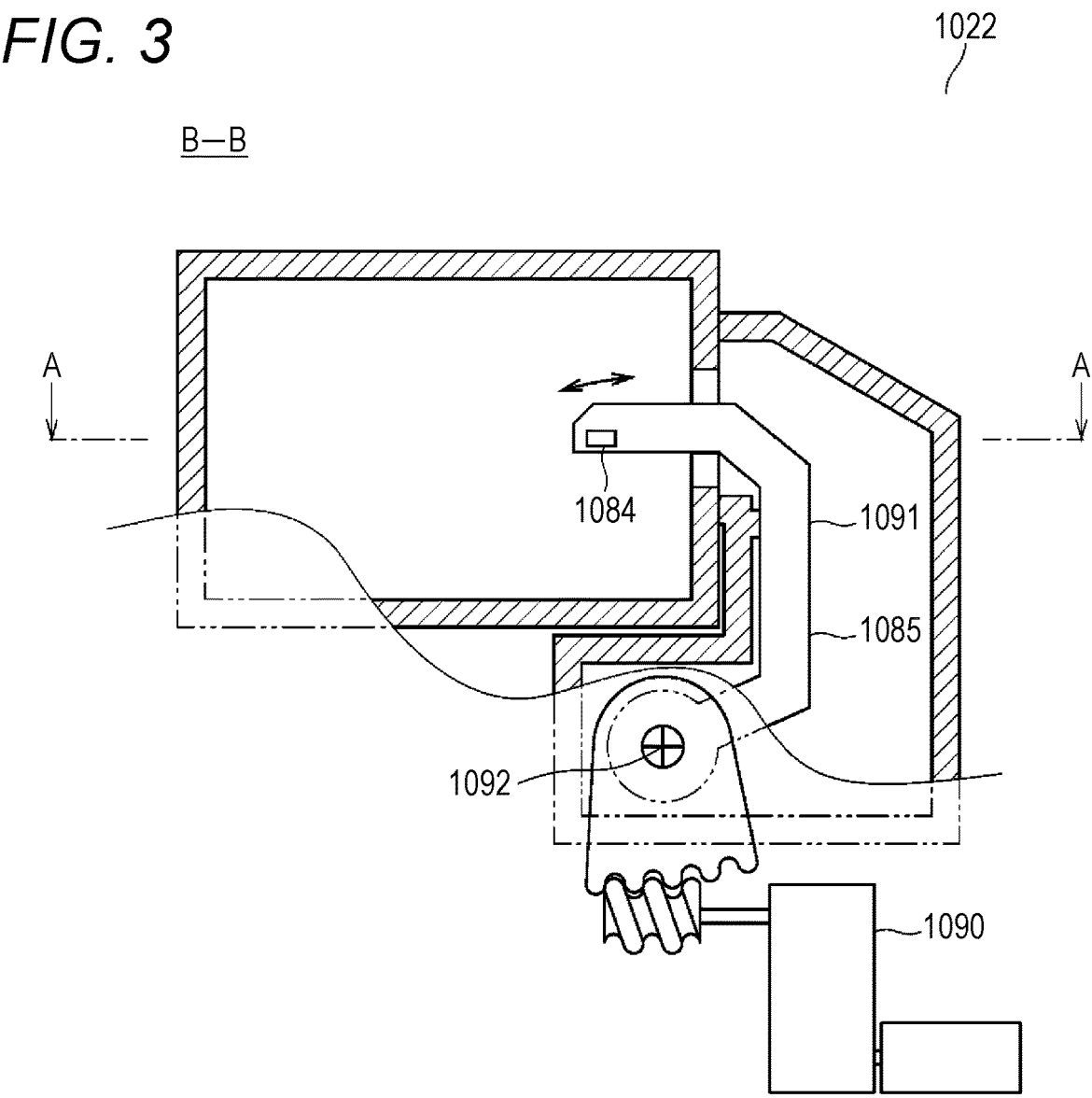
FIG. 3 is a schematic diagram illustrating a partial cross section of the spectroscope provided in the spectrophotometer of the first embodiment and a driving mechanism of an observation light source.

FIG. 1 is a schematic diagram illustrating a spectrophotometer of a first embodiment. FIG. 2 is a schematic diagram illustrating a cross section of a spectroscope provided in the spectrophotometer of the first embodiment. FIG. 3 is a schematic diagram illustrating a partial cross section of the spectroscope provided in the spectrophotometer of the first embodiment and a driving mechanism of an observation light source.

FIG. 2 illustrates a cross section at the position of an A-A cutting plane line in FIG. 3. FIG. 3 illustrates a partial cross section at a B-B cutting plane line in FIG. 2.

A spectrophotometer 1000 in FIG. 1 includes an illumination optical system 1020, a light-receiving optical system 1021, a spectroscope 1022, a controller 1023, and an operation unit 1024. The spectrophotometer 1000 may include a component other than these components.

The spectrophotometer 1000 has d/8 geometry, and is used for an object color. The illumination optical system 1020 in the spectrophotometer 1000 illuminates a sample with diffused light. The light-receiving optical system 1021 receives light to be measured, and guides the light to the spectroscope 1022. The light to be measured is emitted from the sample in a direction at 8° to the normal direction of the surface of the sample. The spectroscope 1022 measures the spectral spectrum of the light to be measured, which has been guided by the light-receiving optical system 1021.

The illumination optical system 1020 includes an illumination light source 1040 and an integrating sphere 1041. The illumination optical system 1020 may include a component other than these components. The light-receiving optical system 1021 includes a light receiving lens 1060. The light-receiving optical system 1021 may include a component other than the light receiving lens 1060. As illustrated in FIGS. 1, 2, and 3, the spectroscope 1022 includes a slit plate 1080, a lens 1081, a grating 1082, a line sensor 1083, an observation light source 1084, and an insertion/extraction mechanism 1085. The spectroscope 1022 may include a component other than these components. A slit 1100 is formed in the slit plate 1080. The slit plate 1080, which is a plate-shaped slit formation, may be replaced with a non-plate-shaped slit formation. The grating 1082 may be replaced with a wavelength dispersing element other than the grating 1082. For example, the grating 1082 may be replaced with a prism. The line sensor 1083 including a plurality of photoelectric conversion elements arranged in a wavelength dispersion direction may be replaced with a sensor other than the line sensor 1083. For example, the line sensor 1083 may be replaced with a sensor including one photoelectric conversion element. In that case, a scanning mechanism for scanning the sensor in the wavelength dispersion direction is provided. Alternatively, a scanning mechanism that rotationally scans the wavelength dispersing element in the wavelength dispersion direction is provided.

1.2 Measurement of Spectral Spectrum

The measurement of a spectral spectrum is started in response to the controller 1023 detecting an operation for instructing the operation unit 1024 to start the measurement. The trigger for starting the measurement may be other than the operation for instructing the operation unit 1024 to start the measurement. For example, the trigger for starting the measurement may be a signal for giving instruction to start the measurement. The signal is input from a device connected to the spectrophotometer 1000 so as to communicate with each other.

At the time of measuring a spectral spectrum, the insertion/extraction mechanism 1085 retracts the observation light source 1084 outside a measurement optical path 1120 under control of the controller 1023. The observation light source 1084 is retracted by a rotation mechanism 1090 rotating an arm 1091, to which the observation light source 1084 is attached, around a rotation center 1092.

At the time of measuring the spectral spectrum, the illumination light source 1040 emits illumination light for illuminating a sample under control of the controller 1023.

The emitted illumination light enters space 1160 inside the integrating sphere 1041 via an opening 1140 in the side surface of the integrating sphere 1041, and is diffused and multiply reflected by a diffusion/reflection surface 1180 surrounding the space 1160. This causes illumination light to be uniformly diffused.

The illumination light, which has been uniformly diffused, is emitted from a measurement opening 1200 in the integrating sphere 1041, illuminates a region facing the measurement opening 1200, and is reflected from the surface of the sample at a position 1220 for measurement. This generates light 1240 to be measured from the position 1220 for measurement.

In order to perform measurement in which regular reflected light is removed, an openable and closable trap 1260 on the integrating sphere 1041 is opened. The regular reflected light is thereby removed.

The generated light 1240 to be measured is imaged on the slit 1100 by the light receiving lens 1060. This generates imaged light 1280 to be measured. The light receiving lens 1060 is movable in the optical axis direction thereof. The size of a region for measurement can be changed by moving the light receiving lens 1060 in the optical axis direction thereof.

The imaged light 1280 to be measured passes through the slit 1100. This generates light 1300 to be measured, which travels along the measurement optical path 1120 between the slit 1100 and the grating 1082.

The light 1300 to be measured, which travels along the measurement optical path 1120, is guided by the lens 1081, and diffracted by the grating 1082. This generates diffracted light including minus first diffracted light 1320. The light 1300 to be measured, which travels along the measurement optical path 1120, is subject to wavelength dispersion owing to the diffraction. As a result, the minus first diffracted light 1320 is light that has been subject to wavelength dispersion.

The generated minus first diffracted light 1320 is received by the line sensor 1083. The line sensor 1083 may receive diffracted light other than the minus first diffracted light 1320.

The line sensor 1083 outputs a signal representing a spectral spectrum corresponding to the received minus first diffracted light 1320.

1.3 Observation of Position for Measurement

The spectrophotometer 1000 has a function of applying observation light to the position 1220 for measurement. An operator of the spectrophotometer 1000 can observe the position 1220 for measurement by visually recognizing a highlight portion, which appears at the time when observation light is applied to the position 1220 for measurement, through a finder hole 1340 on the integrating sphere 1041.

At the time of observing the position 1220 for measurement, the insertion/extraction mechanism 1085 inserts the observation light source 1084 into the measurement optical path 1120 under control of the controller 1023. The observation light source 1084 is inserted by the rotation mechanism 1090 rotating the arm 1091, to which the observation light source 1084 is attached, around the rotation center 1092. In the state where the observation light source 1084 is inserted in the measurement optical path 1120, the light emitting surface of the observation light source 1084 faces the slit 1100, and the observation light source 1084 can emit observation light toward the slit 1100.

At the time of observing the position 1220 for measurement, the observation light source 1084 emits observation light toward the slit 1100 under control of the controller 1023.

The emitted observation light passes through the slit 1100, and is imaged by the light receiving lens 1060.

The slit 1100 is disposed at a position optically conjugate with the position 1220 for measurement. When the observation light source 1084 emits observation light, the slit 1100 is imaged on the surface of the sample. The position where the slit 1100 is imaged corresponds to the position 1220 for measurement. The operator can observe the position 1220 for measurement by visually recognizing the image of the slit 1100 through the finder hole 1340 on the integrating sphere 1041.

The optical conjugation of the slit 1100 and the position 1220 for measurement contributes to preventing the shift of the position where the slit 1100 is imaged even when the position where the observation light source 1084 is disposed is shifted. The insertion of the observation light source 1084 into the measurement optical path 1120 by using the insertion/extraction mechanism 1085 enables the observation light source 1084 to be disposed near the slit 1100, and contributes to increasing observation light that can be used as pointer light.

According to the spectrophotometer 1000 of the first embodiment, observation light that can be used as pointer light can be applied to the position 1220 for measurement without providing large space, for example, between the slit 1100 and the grating 1082 in the spectrophotometer 1000, and the position 1220 for measurement can be easily observed. According to the spectrophotometer 1000 of the first embodiment, an additional member such as a mirror is unnecessary.

1.4 Observation Light Source

The observation light source 1084 includes a light emitting diode (LED) that emits observation light. A thin LED is desired. A light source other than a light emitting diode may emit observation light. In the case where an LED emits observation light, the spectrophotometer 1000 can be downsized. In the case where an LED emits observation light, the power consumption of the observation light source 1084 is reduced, and the life of the observation light source 1084 is prolonged.

Figure 4:
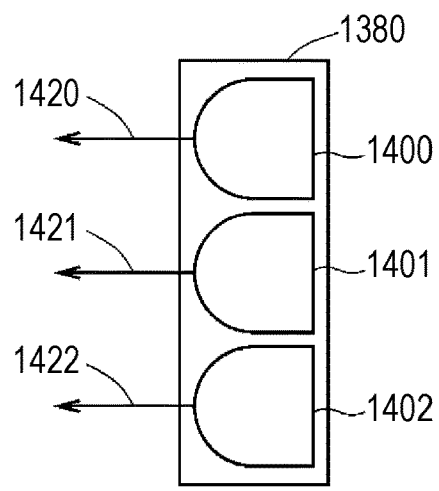
FIG. 4 is a schematic diagram illustrating an observation light source with which the observation light source provided in the spectrophotometer of the first embodiment can be replaced.

FIG. 4 is a schematic diagram illustrating an observation light source with which the observation light source provided in the spectrophotometer of the first embodiment can be replaced.

The observation light source 1084 in FIG. 1 can be replaced with an observation light source 1380 in FIG. 4. The observation light source 1380 includes LEDs 1400, 1401, and 1402. The LEDs 1400, 1401, and 1402 emit light 1420, light 1421, and light 1422, respectively. The light 1420, the light 1421, and the light 1422 have different colors. Three LEDs including the LEDs 1400, 1401, and 1402 may be replaced with two LEDs or four or more LEDs. At least a part of the LEDs 1400, 1401, and 1402 may be replaced with a light source other than the LEDs.

When the observation light source 1084 is replaced with the observation light source 1380, the controller 1023 and the operation unit 1024 operate as a switching mechanism for switching light used as observation light among the light 1420, the light 1421, and the light 1422. That is, the controller 1023 detects an operation, for selecting a color, performed on the operation unit 1024, and controls the LEDs 1400, 1401, and 1402 so that the observation light source 1380 emits light of a color corresponding to the selected color. This enables selection of color of observation light in accordance with the color of the surface of a sample, and enables easier observation of position 1220 for measurement. The color of the sample may be temporarily measured at the time of observing the position 1220 for measurement. The color of light emitted from the observation light source 1380 may be determined by using the result of the temporary measurement.

1.5 Emission of Illumination Light at Time of Observing Position for Measurement In the spectrophotometer 1000 for object color, a gap between the illumination optical system 1020 and a sample is often shielded from light by, for example, a target mask so that outside light other than illumination light does not enter the gap. In the case where the gap is shielded from light, visually recognizing positions other than the position 1220 for measurement is difficult only by applying observation light to the position 1220 for measurement. It cannot thus be determined which portion of the surface of the sample the position 1220 for measurement corresponds to. The illumination light source 1040 may be used as an auxiliary light source at the time of observing the position 1220 for measurement. The illumination light source 1040 may emit illumination light under control of the controller 1023 at the time of observing the position 1220 for measurement. This enables visually recognizing positions other than the position 1220 for measurement, and determining which portion of the surface of the sample the position 1220 for measurement corresponds to.

In the case where illumination light is emitted at the time of observing the position 1220 for measurement, the controller 1023 and the operation unit 1024 function as adjustment mechanisms for adjusting the amount of illumination light. That is, the controller 1023 detects an operation, for setting the amount of illumination light, performed on the operation unit 1024, and controls the illumination light source 1040 so that the illumination light source 1040 emits illumination light having a light amount in accordance with the selected light amount.

1.6 Others

The above-described configuration for applying observation light to the position 1220 for measurement may be adopted in a spectrophotometer other than the spectrophotometer 1000, having d/8 geometry, for object color. The spectral spectrum of light that has been transmitted through a sample may be measured.

2. Second Embodiment

2.1 Main Difference Between First Embodiment and Second Embodiment

The main difference between the first embodiment and a second embodiment is that, in the first embodiment, the observation light source 1084 is inserted into the measurement optical path 1120 at the time of observing the position 1220 for measurement, whereas, in the second embodiment, an observation light source is always disposed on an optical path of zeroth light generated by a grating reflecting light to be measured. The configuration of the spectrophotometer 1000 of the first embodiment or a modification thereof may be adopted in a spectrophotometer of the second embodiment without preventing the adoption of the configuration that cause the main difference.

2.2 Spectrophotometer

Figure 5:
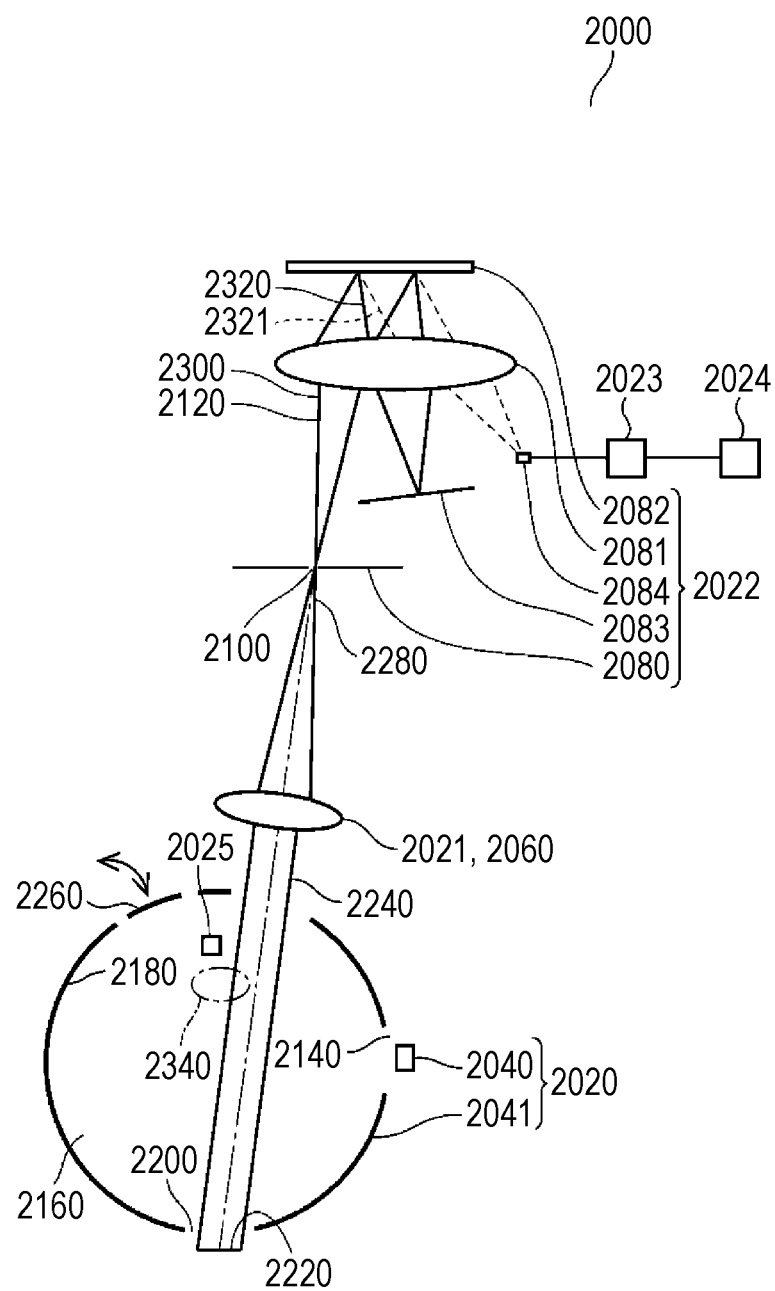
FIG. 5 is a schematic diagram illustrating a spectrophotometer of a second embodiment.

FIG. 5 is a schematic diagram illustrating a spectrophotometer of the second embodiment.

A spectrophotometer 2000 in FIG. 5 includes an illumination optical system 2020, a light-receiving optical system 2021, a spectroscope 2022, a controller 2023, an operation unit 2024, and a camera 2025.

The illumination optical system 2020 includes an illumination light source 2040 and an integrating sphere 2041. The light-receiving optical system 2021 includes a light receiving lens 2060. The spectroscope 2022 includes a slit plate 2080, a lens 2081, a grating 2082, a line sensor 2083, and an observation light source 2084. A slit 2100 is formed in the slit plate 2080.

2.3 Measurement of Spectral Spectrum

At the time of measuring a spectral spectrum, the illumination light source 2040 emits illumination light for illuminating a sample under control of the controller 2023.

The emitted illumination light enters space 2160 inside the integrating sphere 2041 via an opening 2140 in the side surface of the integrating sphere 2041, and is diffused and multiply reflected by a diffusion/reflection surface 2180 surrounding the space 2160. This causes illumination light to be uniformly diffused.

The illumination light, which has been uniformly diffused, is emitted from a measurement opening 2200 in the integrating sphere 2041, illuminates a region facing the measurement opening 2200, and is reflected from the surface of a sample at a position 2220 for measurement. This generates light 2240 to be measured from the position 2220 for measurement.

The generated light 2240 to be measured is imaged by the light receiving lens 2060. This generates imaged light 2280 to be measured.

The imaged light 2280 to be measured passes through the slit 2100. This generates light 2300 to be measured, which travels along a measurement optical path 2120 between the slit 2100 and the grating 2082.

The light 2300 to be measured, which travels along the measurement optical path 2120, is guided by the lens 2081, and diffracted and reflected by the grating 2082. This generates diffracted light including minus first diffracted light 2320. The reflection generates zeroth light 2321. The light 2300 to be measured, which travels along the measurement optical path 2120, is subject to wavelength dispersion owing to the diffraction. As a result, the minus first diffracted light 2320 is light that has been subject to wavelength dispersion.

The generated minus first diffracted light 2320 is received by the line sensor 2083.

The line sensor 2083 outputs a signal representing a spectral spectrum corresponding to the received minus first diffracted light 2320.

2.4 Observation of Position for Measurement

The spectrophotometer 2000 has a function of applying observation light to the position 2220 for measurement. An operator can observe the position 2220 for measurement by visually recognizing, for example, a bright point and a bright line, which appears when observation light is applied to the position 2220 for measurement, through a finder hole 2340 on the integrating sphere 2041.

The observation light source 2084 is disposed on the optical path of the zeroth light 2321. Since the optical path of the zeroth light 2321 is outside the measurement optical path 2120, retraction of the observation light source 2084 at the time of measuring the spectral spectrum is unnecessary. For example, the movable observation light source 2084 and a movable mirror for reflecting observation light are unnecessary. A driving mechanism for moving, for example, the observation light source 2084 and the mirror for reflecting observation light is unnecessary.

At the time of observing the position 2220 for measurement, the observation light source 2084 emits observation light toward the grating 2082 under control of the controller 2023.

The emitted observation light is reflected by the grating 2082, passes through the slit 2100, and is imaged by the light receiving lens 2060.

When the observation light source 2084 emits observation light, the slit 2100 is imaged on the surface of the sample. The position where the slit 2100 is imaged corresponds to the position 2220 for measurement. The operator can observe the position 2220 for measurement by visually recognizing the image of the slit 2100 through a finder hole 2340 on the integrating sphere 2041.

In the second embodiment, unlike the first embodiment, the slit 2100 does not need to be disposed at a position optically conjugate with the position 2220 for measurement.

According to the spectrophotometer 2000 of the second embodiment, observation light can be applied to the position 2220 for measurement without providing large space in the spectrophotometer 2000, and the position 2220 for measurement can be easily observed. According to the spectrophotometer 2000 of the second embodiment, an additional member such as a mirror is unnecessary.

In addition, according to the spectrophotometer 2000 of the second embodiment, observation light is applied to the entire entrance pupil of the spectroscope 2022 even when the observation light source 2084 has a small light emission area. In the observation light that has passed through the slit 2100, NA is equal to NA of the spectroscope 2022. Even when the slit 2100 is not disposed at a position optically conjugate with the position 2220 for measurement, the entire region for measurement can be observed.

2.5 Wavelength of Observation Light

Observation light may have a wavelength outside the wavelength range of a spectral spectrum to be measured. For example, in the case where the wavelength range of a spectral spectrum to be measured is in a visible range, observation light may have a wavelength belonging to the ultraviolet region or infrared region. This prevents observation light from influencing measurement of the spectral spectrum, so that the position 2220 for measurement can be observed at the time of measuring the spectral spectrum.

In the case where observation light has a wavelength outside the wavelength range of the spectral spectrum to be measured, the camera 2025 has sensitivity to the wavelength of the observation light, and captures an image of the position 2220 for measurement.

2.6 Placement of Grating

Figure 6:
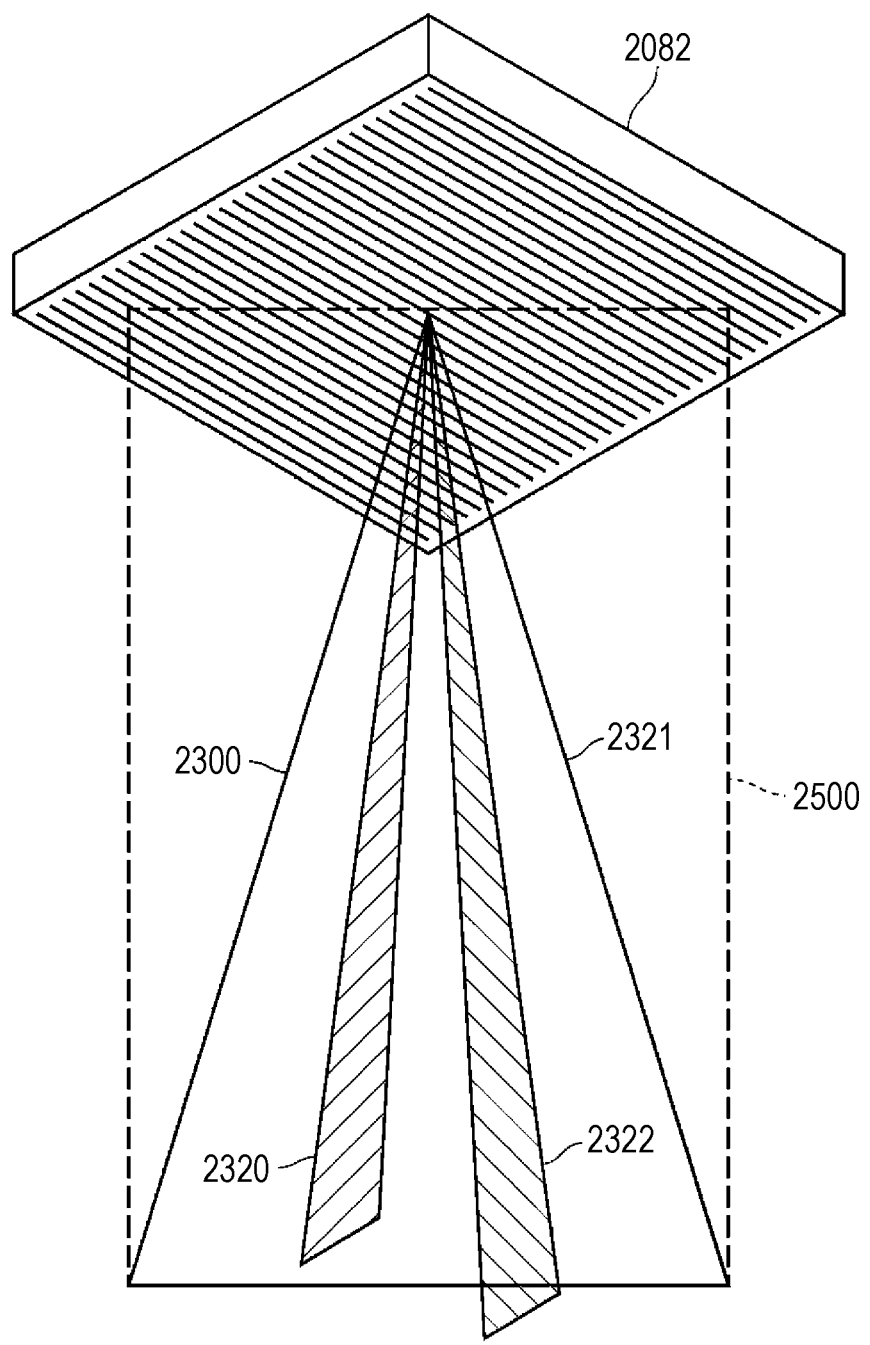
FIG. 6 is a perspective view illustrating placement of a grating in the spectrophotometer of the second embodiment.
Figure 7:
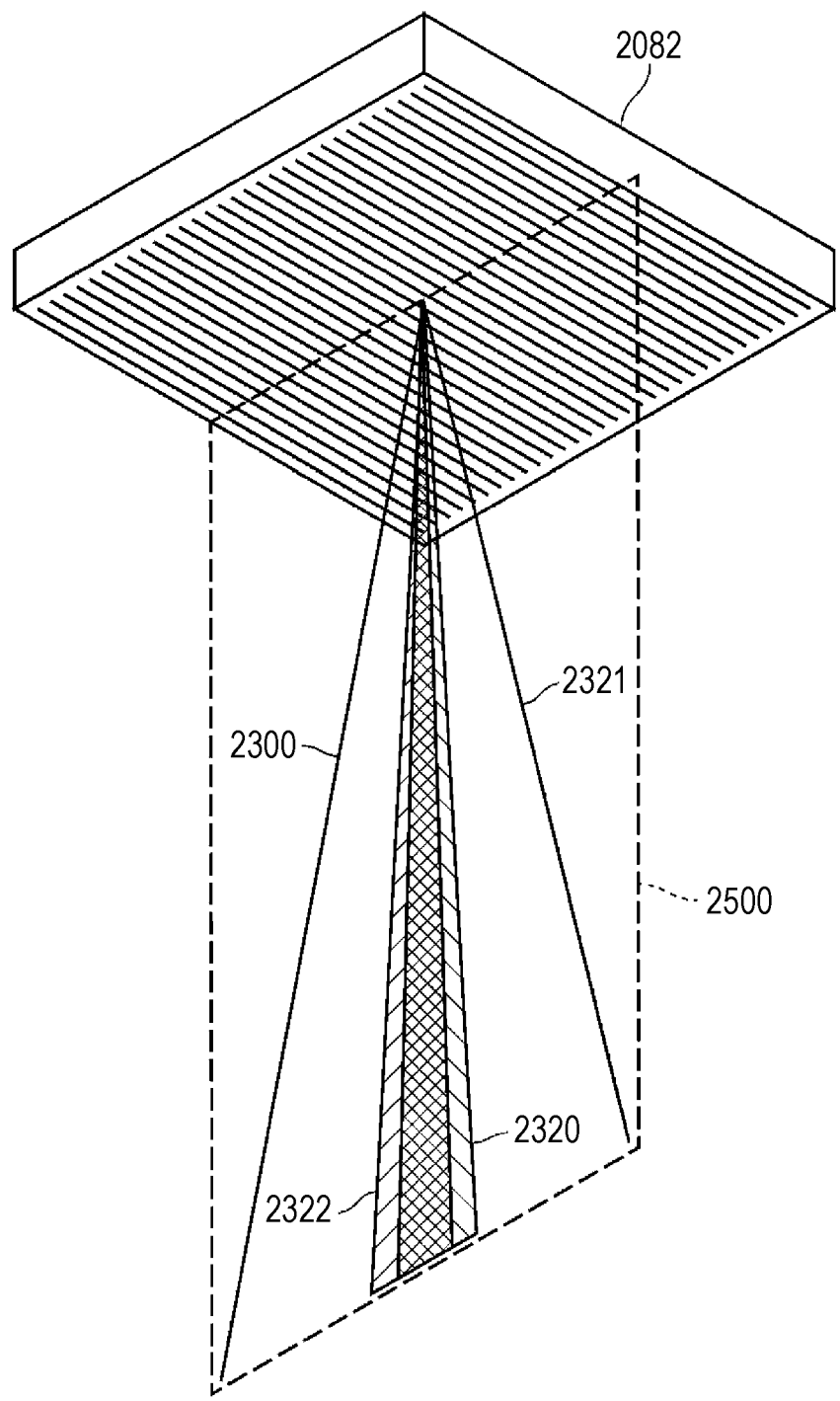
FIG. 7 is a perspective view illustrating placement of the grating compared to the placement of the grating in the spectrophotometer of the second embodiment.

FIG. 6 is a perspective view illustrating placement of a grating in the spectrophotometer of the second embodiment. FIG. 7 is a perspective view illustrating placement of the grating compared to the placement of the grating in the spectrophotometer of the second embodiment.

In the spectrophotometer 2000 of the second embodiment, as illustrated in FIG. 6, the grating 2082 is installed such that the minus first diffracted light 2320 deviates from a plane 2500. The plane 2500 includes a main light beam of the light 2300, traveling along the measurement optical path 2120, to be measured and a main light beam of the zeroth light 2321.

In the case where the minus first diffracted light 2320 does not deviate from the plane 2500 including the main light beam of the light 2300, traveling along the measurement optical path 2120, to be measured and the main light beam of the zeroth light 2321 as illustrated in FIG. 7, the minus first diffracted light 2320 travels to the same position as that first diffracted light 2322 travels to, and the line sensor 2083 receives both the minus first diffracted light 2320 and the first diffracted light 2322. The minus first diffracted light 2320 is generated by the grating 2082 diffracting the light 2300 to be measured. The first diffracted light 2322 is generated by the grating 2082 diffracting light from an optical path of the zeroth light 2321. Reflected light generated by the observation light source 2084 reflecting the zeroth light 2321 or fluorescence emitted when the observation light source 2084 receives the zeroth light 2321 is stray light, influencing the measurement of a spectral spectrum.

In contrast, in the case where the grating 2082 is rotated with respect to the minus first diffracted light 2320 and the zeroth light 2321 and the minus first diffracted light 2320 deviates from the plane 2500 including the main light beam of the light 2300, traveling along the measurement optical path 2120, to be measured and the main light beam of the zeroth light 2321 as illustrated in FIG. 6, the minus first diffracted light 2320 travels to a position different from that the first diffracted light 2322 travels to, and the line sensor 2083 receives the minus first diffracted light 2320 but does not receive the first diffracted light 2322. The minus first diffracted light 2320 is generated by the grating 2082 diffracting the light 2300 to be measured. The first diffracted light 2322 is generated by the grating 2082 diffracting light from the optical path of the zeroth light 2321. Reflected light generated by the observation light source 2084 reflecting the zeroth light 2321 or fluorescence emitted when the observation light source 2084 receives the zeroth light 2321 does not influence the measurement of a spectral spectrum.

Although the invention has been described in detail, the above description is illustrative in all aspects, and the invention is not limited thereto. It is understood that countless variations not illustrated are conceivable without departing from the scope of the invention.

REFERENCE SIGNS LIST 1000, 2000 Spectrophotometer
1020, 2020 Illumination optical system
1021, 2021 Light-receiving optical system
1022, 2022 Spectroscope
1023, 2023 Controller
1024, 2024 Operation unit
1060, 2060 Light receiving lens
1080, 2080 Slit plate
1081, 2081 Lens
1082, 2082 Grating
1083, 2083 Line sensor
1084, 1380, 2084 Observation light source
1085 Insertion/extraction mechanism
1100, 2100 Slit
1120, 2120 Measurement optical path
1220, 2220 Position for measurement
1240, 2240 Light to be measured
1320, 2320 minus first diffracted light
1400, 1401, 1402 LED
2025 Camera
2321 Zeroth light

The invention claimed is:

1. A spectrophotometer comprising:
a light-receiving optical system that images light to be measured from a position for measurement and generates imaged light to be measured;
a slit formation including a slit that is disposed at a position optically conjugate with the position for measurement, permitting at least a portion of the imaged light to be measured to pass, which travels along a measurement optical path;
a wavelength dispersing element that performs wavelength dispersion on the light to be measured, which travels the measurement optical path and outputs wavelength dispersed light to be measured;
a sensor that receives the wavelength dispersed light to be measured, and outputs a signal representing a spectral spectrum;
an observation light source that emits observation light at a time of observing the position for measurement; and
an insertion/extraction mechanism that inserts the observation light source into the measurement optical path so that the observation light is emitted toward the slit at a time of observing the position for measurement, and that retracts the observation light source outside the measurement optical path at a time of measuring the spectral spectrum.

2. The spectrophotometer according to claim 1, wherein the observation light source includes a light emitting diode that emits the observation light.

3. The spectrophotometer according to claim 2, wherein the observation light source includes a plurality of light sources, each of the plurality of light sources emitting a plurality of beams of light, the plurality of beams of light including different colors, and the spectrophotometer further comprises a controller configured to control the plurality of light sources so as to emit light of a color corresponding to a selected color.

4. The spectrophotometer according to claim 2, further comprising an illumination light source that emits illumination light for illuminating a sample at a time of measuring the spectral spectrum and emits the illumination light also at a time of observing the position for measurement, and further comprising a light receiving optical system that receives the light from the sample that is illuminated by the illumination light source.

5. The spectrophotometer according to claim 1, wherein the observation light source includes a plurality of light sources, each of the plurality of light sources emitting a plurality of beams of light, the plurality of beams of light including different colors, and the spectrophotometer further comprises a controller configured to control the plurality of light sources so as to emit light of a color corresponding to a selected color.

6. The spectrophotometer according to claim 1, further comprising an illumination light source that emits illumination light for illuminating a sample at a time of measuring the spectral spectrum and emits the illumination light also at a time of observing the position for measurement, and further comprising a light receiving optical system that receives the light from the sample that is illuminated by the illumination light source.

7. The spectrophotometer according to claim 6, further comprising a controller configured to control an amount of the illumination light at a time of observing the position for measurement.

* * * * *